United States Patent
Sakurada et al.

(10) Patent No.: US 11,584,215 B2
(45) Date of Patent: Feb. 21, 2023

(54) DRIVE UNIT AND VEHICLE

(71) Applicant: HONDA MOTOR CO., LTD., Tokyo (JP)

(72) Inventors: Manabu Sakurada, Saitama (JP); Takahiro Hagimoto, Saitama (JP); Toru Nakamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 16/919,381

(22) Filed: Jul. 2, 2020

(65) Prior Publication Data
US 2021/0001713 A1  Jan. 7, 2021

(30) Foreign Application Priority Data

Jul. 2, 2019 (JP) .............................. JP2019-123965

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/043* (2013.01); *H02K 7/006* (2013.01);
(Continued)

(58) Field of Classification Search
CPC ................ B60K 7/0007; B60K 17/043; B60K 2007/0092; H02K 7/006; H02K 7/116; H02K 11/33; H02K 2211/03
See application file for complete search history.

(56) References Cited

U.S. PATENT DOCUMENTS

| | | |
|---|---|---|
| 2005/0143210 A1 | 6/2005 | Hamai et al. |
| 2010/0084206 A1 | 4/2010 | Yoshida et al. |
| | (Continued) | |

FOREIGN PATENT DOCUMENTS

| | | |
|---|---|---|
| JP | 2007-099121 A | 4/2007 |
| JP | 2008-195259 A | 8/2008 |
| | (Continued) | |

OTHER PUBLICATIONS

Feb. 15, 2022, Japanese Office Action issued for related JP Application No. 2019-123965.
(Continued)

*Primary Examiner* — Erez Gurari
(74) *Attorney, Agent, or Firm* — Paratus Law Group, PLLC (57) ABSTRACT

A drive unit includes: a rotary electric machine; a rotary electric machine case accommodating the rotary electric machine; an electric power conversion device electrically connected to the rotary electric machine and configured to convert electric power supplied to the rotary electric machine and electric power supplied from the rotary electric machine; and an output shaft extending out from the rotary electric machine case and configured to output power of the rotary electric machine. The electric power conversion device is arranged on one side of the rotary electric machine. The output shaft is arranged between the rotary electric machine and the electric power conversion device.

7 Claims, 6 Drawing Sheets

(51) Int. Cl.
  *H02K 7/00* (2006.01)
  *H02K 11/33* (2016.01)
  *H02K 7/116* (2006.01)
(52) U.S. Cl.
  CPC ............ *H02K 7/116* (2013.01); *H02K 11/33* (2016.01); *B60K 2007/0092* (2013.01); *H02K 2211/03* (2013.01)

(56) References Cited

U.S. PATENT DOCUMENTS

| | | | |
|---|---|---|---|
| 2012/0049664 | A1 | 3/2012 | Yokoyama et al. |
| 2013/0112491 | A1* | 5/2013 | Suzuki .................... B60K 1/02 903/903 |
| 2015/0251531 | A1 | 9/2015 | Hotta et al. |
| 2016/0052380 | A1† | 2/2016 | Miyazawa |
| 2018/0022202 | A1 | 1/2018 | Urabe et al. |
| 2018/0222307 | A1 | 8/2018 | Fujiyoshi et al. |
| 2018/0262089 | A1 | 9/2018 | Hatch |
| 2019/0107184 | A1* | 4/2019 | Matsuto ............. F16H 25/2015 |
| 2019/0190348 | A1* | 6/2019 | Verbridge ............... H02K 7/116 |
| 2020/0049236 | A1* | 2/2020 | Shimizu ................. F16H 25/22 |
| 2020/0161922 | A1* | 5/2020 | Okuhata ................ H02K 5/225 |
| 2020/0292039 | A1* | 9/2020 | Matsuto .................... H02K 7/06 |
| 2020/0378482 | A1* | 12/2020 | Blesener ................ H02K 7/116 |
| 2020/0395811 | A1* | 12/2020 | Ganev ................. F16H 57/0486 |
| 2021/0001713 | A1* | 1/2021 | Sakurada ............. B60K 7/0007 |
| 2021/0086635 | A1* | 3/2021 | Ueda ...................... B60L 3/0061 |
| 2021/0095746 | A1* | 4/2021 | Ikeda ..................... H02K 7/116 |
| 2021/0313860 | A1* | 10/2021 | Jang ........................ B60K 11/02 |

FOREIGN PATENT DOCUMENTS

| | | |
|---|---|---|
| JP | 2008-290621 A | 12/2008 |
| JP | 2012-051386 A | 3/2012 |
| JP | 2012-140052 A | 7/2012 |
| JP | 2013-21855 A † | 1/2013 |
| JP | 2015-067221 A | 4/2015 |
| JP | 2015-220908 A | 12/2015 |
| JP | 2016-220385 A † | 12/2016 |
| WO | WO 2013/069774 A1 | 5/2013 |
| WO | WO 2016/121032 A1 | 8/2016 |

OTHER PUBLICATIONS

Nov. 2, 2021, Japanese Information Offer issued for related JP Application No. 2019-123965.
Jul. 26, 2022, Japanese Information Offer issued for related JP Application No. 2019-123965.

\* cited by examiner
† cited by third party

DRIVE UNIT AND VEHICLE

CROSS-REFERENCE TO RELATED APPLICATIONS

The present application claims the benefit of priority of Japanese Patent Application No. 2019-123965, filed on Jul. 2, 2019, the content of which is incorporated herein by reference.

TECHNICAL FIELD

The present invention relates to a drive unit mounted on a vehicle and a vehicle.

BACKGROUND ART

Vehicles such as a hybrid vehicle and an electric vehicle using a rotary electric machine as a drive source are known. In such a vehicle, an electric power conversion device that is electrically connected to the rotary electric machine and converts electric power supplied to the rotary electric machine and electric power supplied from the rotary electric machine is mounted together with the rotary electric machine. In the related art, a rotary electric machine and an electric power conversion device are electrically connected using a three-phase line, but in recent years, attempts have been made to directly fix the rotary electric machine and the electric power conversion device into a unit.

For example, WO 2016/121032 proposes that an electric power conversion device is directly fixed above a rotary electric machine as a drive unit. On the other hand. US 2018/0262089 A1 proposes that an electric power conversion device is directly fixed to one side of a rotary electric machine in a direction orthogonal to both a rotation axis direction and an upper-lower direction as a drive unit.

However, when a distance between the rotary electric machine and the electric power conversion device is short, heat of the rotary electric machine is likely to be transmitted to the electric power conversion device.

SUMMARY

The present invention provides a drive unit and a vehicle that can suppress an influence of heat of a rotary electric machine on an electric power conversion device while the rotary electric machine and the electric power conversion device are arranged close to each other.

According to an aspect of the present invention, there is provided a drive unit including: a rotary electric machine; a rotary electric machine case accommodating the rotary electric machine; an electric power conversion device electrically connected to the rotary electric machine and configured to convert electric power supplied to the rotary electric machine and electric power supplied from the rotary electric machine; and an output shaft extending out from the rotary electric machine case and configured to output power of the rotary electric machine, where: the electric power conversion device is arranged on one side of the rotary electric machine; and the output shaft is arranged between the rotary electric machine and the electric power conversion device.

According to the present invention, an influence of heat of the rotary electric machine on the electric power conversion device can be suppressed while the rotary electric machine and the electric power conversion device are arranged close to each other.

DESCRIPTION OF EMBODIMENTS

Hereinafter, an embodiment of a drive unit and a vehicle according to the present invention will be described with reference to the drawings. Incidentally, in the present invention, a direction orthogonal to an upper-lower direction is a horizontal direction, and two directions orthogonal to each other in the horizontal direction are a front-rear direction and a left-right direction. In addition, in the drawings, a front side of a drive unit 30 is denoted by Fr, a rear side thereof is denoted by Rr, a left side thereof is denoted by L, a right side thereof is denoted by R, an upper side thereof is denoted by U, and a lower side thereof is denoted by D. However, these directions may be different from directions when the drive unit is mounted on a vehicle or the like.

[Drive Unit]

Figure 1:
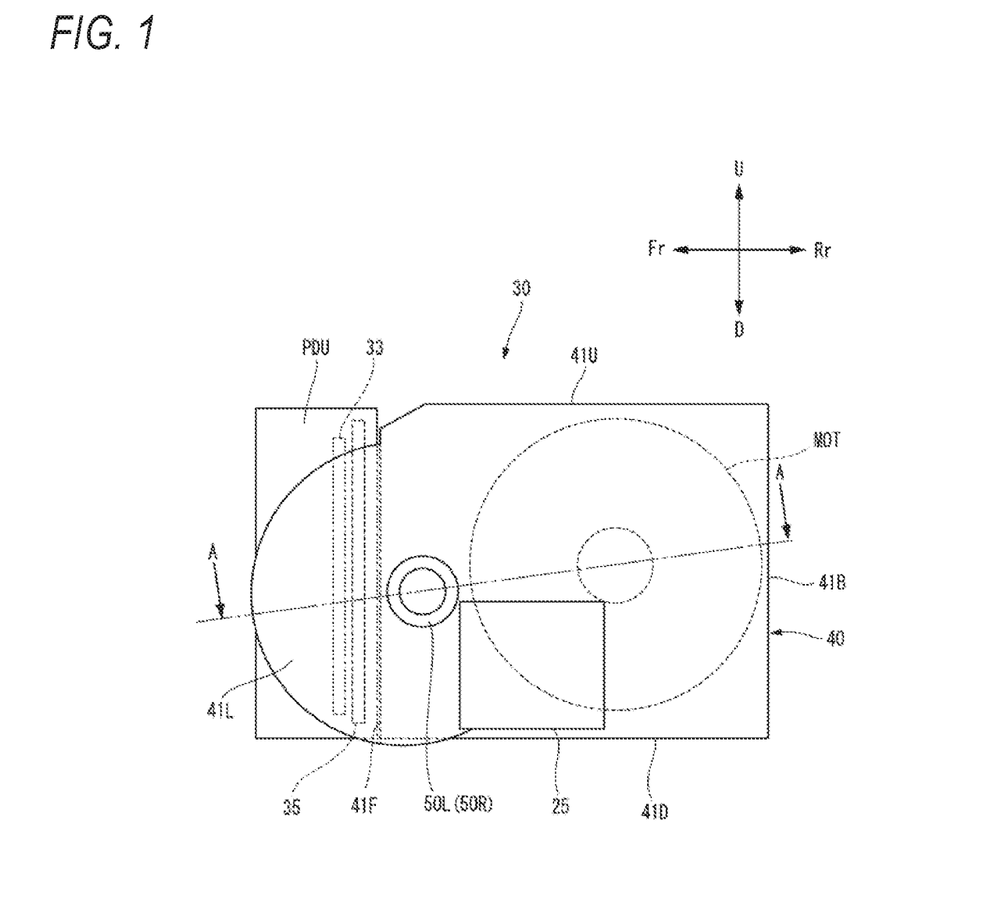
FIG. 1 is a side view of a drive unit according to an embodiment of the present invention.
Figure 2:
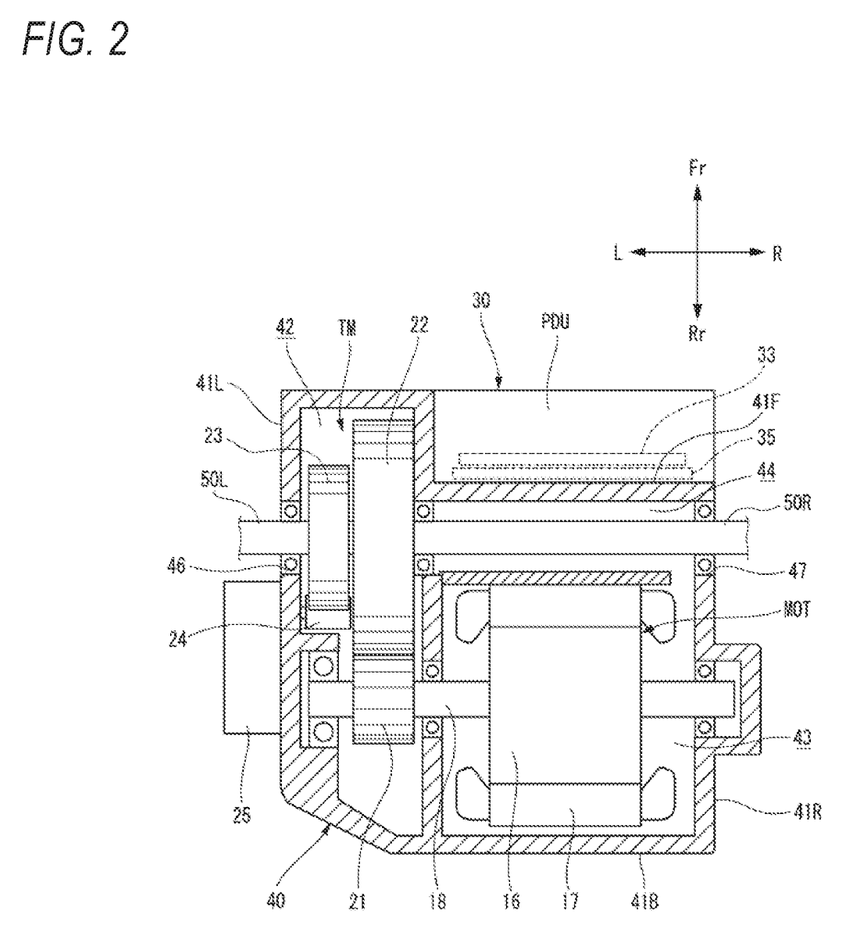
FIG. 2 is a sectional view taken along a line A-A of FIG. 1.

The drive unit 30 according to the present embodiment includes an electric motor MOT, a power transmission mechanism TM, an electric motor case 40 that accommodates the electric motor MOT and the power transmission mechanism TM, an electric power conversion device PDU that is electrically connected to the electric motor MOT and converts electric power supplied to the electric motor MOT and electric power supplied from the electric motor MOT, and output shafts 50L, 50R that extend out from the electric motor case 40 and output power of the electric motor MOT.

The electric motor case 40 has a substantially rectangular parallelepiped shape having a front wall 41F, a rear wall 41B, a left wall 41L, a right wall 41R an upper wall 41U, and a lower wall 41D. Inside the electric motor case 40, a transmission mechanism accommodation chamber 42 for accommodating the power transmission mechanism TM is provided on a left side, an electric motor accommodation chamber 43 for accommodating the electric motor MOT is provided on a right side, and an output shaft accommodation chamber 44 through which the output shaft 50R is inserted is provided in front of the electric motor accommodation chamber 43.

The electric motor MOT includes a rotor 16, a stator 17 arranged at a radially outer side of the rotor 16 so as to face the rotor 16, and a rotation shaft 18 that rotates integrally with the rotor 16, and is rotatably supported by the electric motor accommodation chamber 43 such that the rotation shaft 18 faces in the left-right direction. A left end portion of the rotation shaft 18 extends from the electric motor accommodation chamber 43 to the transmission mechanism accommodation chamber 42, and a drive gear 21 is attached to a left end portion of the rotation shaft 18.

The transmission mechanism accommodation chamber 42 is provided with the drive gear 21 and a driven gear 22 that meshes with the drive gear 21 and rotates integrally with the output shafts 50L, 50R. Rotation of the rotation shaft 18 is transmitted to the output shafts 50L, 50R by the drive gear 21 and the driven gear 22 constituting the power transmission mechanism TM. The output shaft 50L extends out of an opening 46 of the left wall 41L through the transmission mechanism accommodation chamber 42, and the output shaft 50R extends out of an opening 47 of the right wall 41R through the output shaft accommodation chamber 44.

In addition, a pair of auxiliary machine gears 23, 24 are provided in the transmission mechanism accommodation chamber 42, and an auxiliary machine 25 provided outside the electric motor case 40 can be driven by rotation of the output shafts 50L, 50R. The auxiliary machine 25 is, for example, a water pump.

The electric power conversion device PDU is arranged in front of the electric motor MOT, and a board 33 accommodated therein is arranged substantially parallel to the front wall 41F. The electric power conversion device PDU may be configured separately from the electric motor case 40 and attached to the front wall 41F of the electric motor case 40, or may be integrally configured with the electric motor case 40. By being integrally configured with the electric motor case 40, an operation of assembling the electric power conversion device PDU can be made unnecessary.

By arranging the electric power conversion device PDU in front of the electric motor MOT as described above, a height dimension of the drive unit 30 can be suppressed. In addition, since the power transmission mechanism TM and the electric motor MOT are arranged side by side in the left-right direction inside the electric motor case 40, the height dimension of the drive unit 30 can be further reduced. Further, in the present embodiment, as shown in FIG. 1, the output shafts 50L, 50R extend parallel to the rotation shaft 18 and overlap with the rotation shaft 18 in the upper-lower direction. Therefore, the height dimension of the drive unit 30 can be further suppressed.

In the drive unit 30 configured as described above, since the output shaft 50R is arranged between the electric motor MOT and the electric power conversion device PDU, there is a space through which the output shaft 50R passes, as an air layer, between the electric motor MOT and the electric power conversion device PDU, so that heat of the electric motor MOT can be suppressed from being transmitted to the electric power conversion device PDU.

The electric power conversion device PDU is provided with a cooling part 35 through which a refrigerant passes between the board 33 of the electric power conversion device PDU and the output shafts 50L, 50R. Incidentally, the cooling part 35 may be provided in the electric motor case 40 as long as the cooling part 35 is positioned between the board 33 of the electric power conversion device PDU and the output shafts 50L, 50R. Accordingly, the board 33 of the electric power conversion device PDU and an electric component mounted on the board 33 can be cooled using spaces around the output shafts 50L, 50R.

In the embodiment described above, the output shafts 50L, 50R extend in the left-right direction parallel to the rotation shaft 18, but the present invention is not limited thereto.

Figure 3:
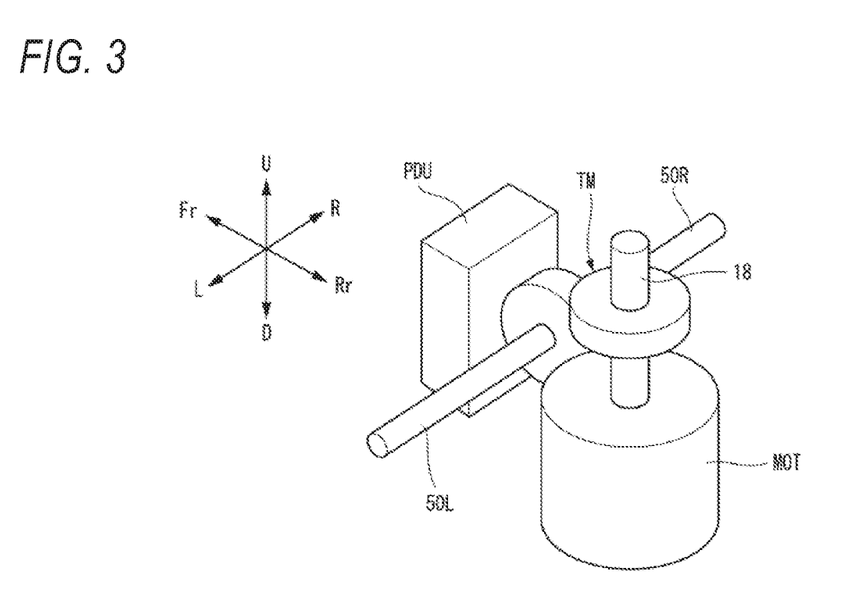
FIG. 3 is a diagram showing a relationship of an output shaft, a rotary electric machine, and an electric power conversion device in a drive unit according to a first modification of the present invention.

For example, as shown in a first modification of FIG. 3, the rotation shaft 18 of the electric motor MOT may extend in the upper-lower direction, the output shafts 50L, 50R may extend in the left-right direction (horizontal direction) so as to be orthogonal to the rotation shaft 18, and the rotation shaft 18 and the output shafts 50L, 50R may be configured to transmit power by the power transmission mechanism TM including a bevel gear or the like.

Figure 4:
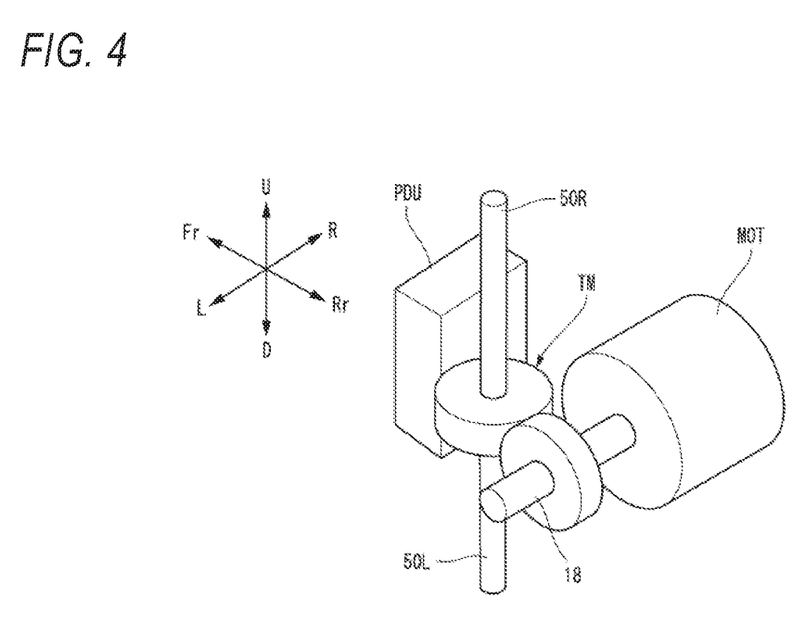
FIG. 4 is a diagram showing a relationship of an output shaft, a rotary electric machine, and an electric power conversion device in a drive unit according to a second modification of the present invention.

Further, as shown in a second modification of FIG. 4, the rotation shaft 18 of the electric motor MOT may extend in the left-right direction (horizontal direction), the output shafts 50L, 50R may extend in the upper-lower direction so as to be orthogonal to the rotation shaft 18, and the rotation shaft 18 and the output shafts 50L, 50R may be configured to transmit power by the power transmission mechanism TM including a bevel gear or the like.

According to these modifications, as long as the output shafts 50L, 50R are arranged between the electric motor MOT and the electric power conversion device PDU, the heat of the electric motor MOT can be suppressed from being transmitted to the electric power conversion device PDU.

[Vehicle]

Next, an embodiment of a vehicle equipped with the drive unit according to the embodiment described above will be described.

Figure 5:
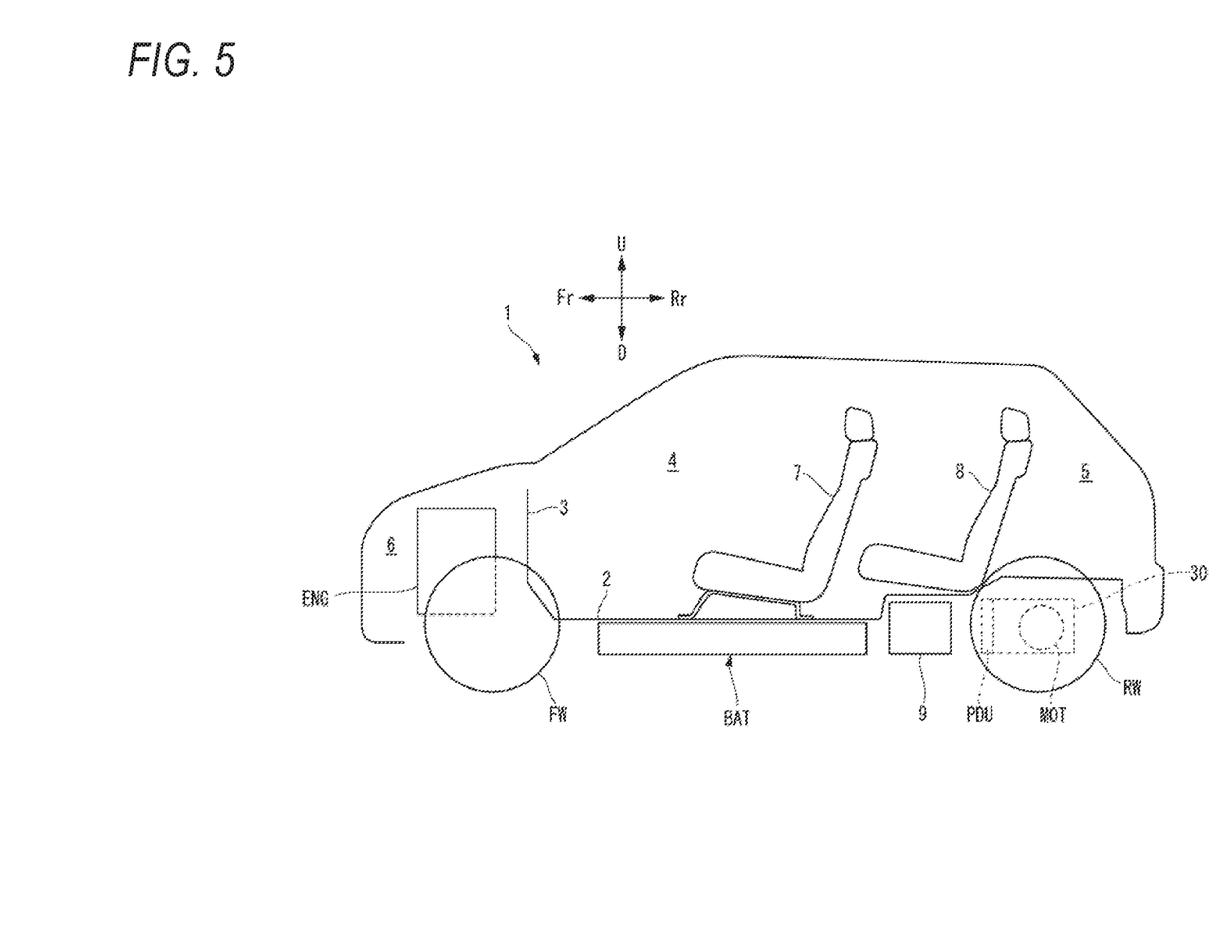
FIG. 5 is a schematic side view of a vehicle according to an embodiment on which the drive unit of FIG. 1 is mounted.
Figure 6:
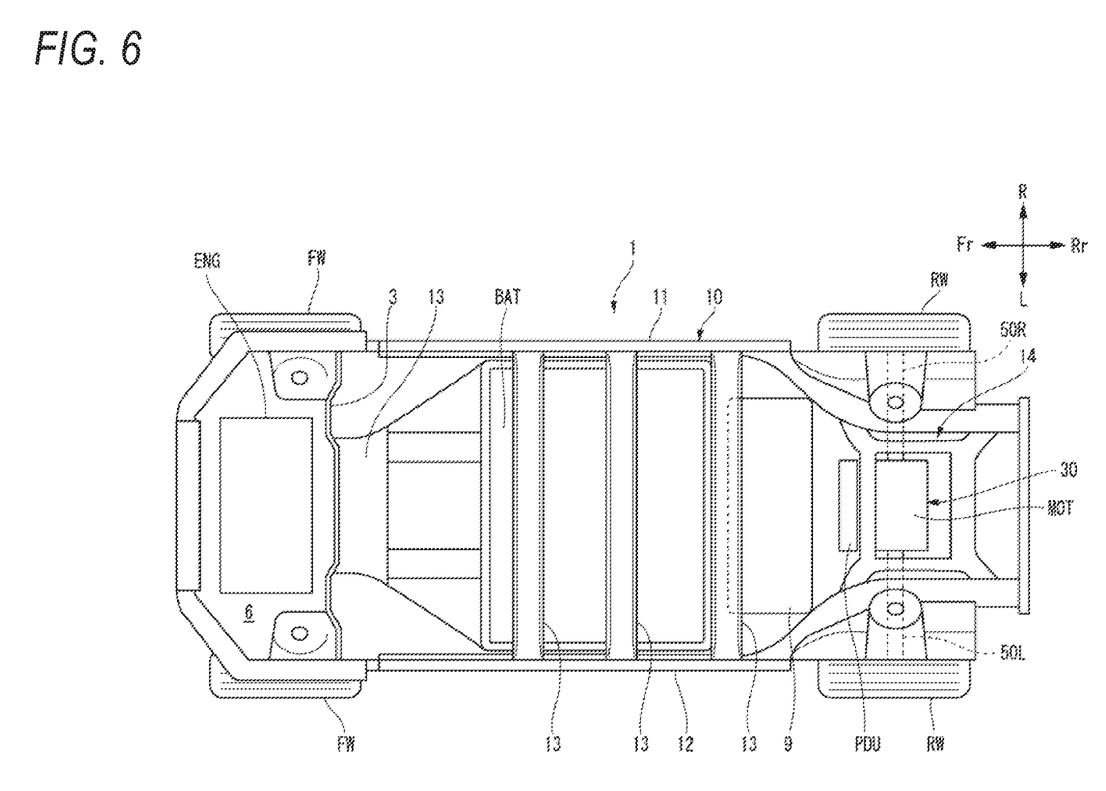
FIG. 6 is a plan view showing an underfloor structure of the vehicle of FIG. 5.

As shown in FIGS. 5 and 6, a vehicle 1 is formed by a vehicle interior 4, a luggage compartment 5, and a front room 6 in front of the vehicle interior 4 and the luggage compartment 5, which are defined by a floor panel 2 and a dash panel 3. A front seat 7 and a rear seat 8 are provided in the vehicle interior 4. An engine ENG as a drive source for driving the left and right front wheels FW is provided in the front room 6, and the drive unit 30 accommodating the electric motor MOT as a drive source for driving the left and right rear wheels RW is provided below the luggage compartment 5. That is, the vehicle 1 is a so-called hybrid vehicle in which both the engine ENG and the electric motor MOT are used as the drive sources.

A battery BAT and a fuel tank 9 are arranged below the vehicle interior 4. The battery BAT and the drive unit 30 are connected via a DC line (not shown), and the engine ENG and the fuel tank 9 are connected via a fuel pipe (not shown). When the electric power conversion device PDU and the battery BAT are electrically connected to each other, a direct current electric power from the battery BAT is converted into an alternating current electric power by the electric power conversion device PDU and supplied to the electric motor MOT during power running driving of the electric motor MOT, and the alternating current electric power from the electric motor MOT is converted into the direct current electric power by the electric power conversion device PDU and supplied to the battery BAT during regenerative driving of the motor MOT.

A vehicle body frame 10 includes a pair of left and right side frames 11, 12 extending in the front-rear direction, a plurality of cross members 13 extending in a vehicle width direction and connecting the side frames 11, 12, and a sub-frame 14 supporting the drive unit 30 and having a substantially rectangular shape in a plan view.

The drive unit 30 is supported by the sub-frame 14 such that the rotation shaft 18 of the electric motor MOT extends in the vehicle width direction and the front wall 41F of the electric power conversion device PDU faces the front of the vehicle 1. In addition, the pair of rear wheels RW are connected to the output shafts 50L, 50R, respectively. Even in a state in which the drive unit 30 is mounted on the vehicle 1 as described above, since the output shafts 50L, 50R are arranged between the electric motor MOT and the electric power conversion device PDU, the heat of the electric motor MOT can be suppressed from being transmitted to the electric power conversion device PDU, and output restriction due to temperature rise of the electric power conversion device PDU can be suppressed.

In addition, since the electric power conversion device PDU is arranged in front of the electric motor MOT, and the output shafts 50L, 50R extend parallel to the rotation shaft 18 and overlap with the rotation shaft 18 in the upper-lower direction, the height dimension of the drive unit 30 when mounted on the vehicle is reduced.

Therefore, even when the drive unit 30 is arranged below the luggage compartment 5, it is possible to secure a wide luggage compartment space.

Although the embodiment of the present invention has been described above, the present invention is not limited to the above-described embodiment, and modifications, improvements, or the like can be made as appropriate.

For example, although the drive unit 30 is arranged below the luggage compartment 5 and the left and right rear wheels RW are respectively connected to the output shafts 50L, 50R in the embodiment described above, the present invention is not limited thereto. The drive unit 30 may be arranged in the front room 6, and the left and right front wheels FW may be respectively connected to the output shafts 50L, 50R.

The two output shafts 50L, 50R are extended out from the drive unit 30, and the left and right rear wheels RW are respectively connected to the two output shafts 50L, 50R in the embodiment described above, but the present invention is not limited thereto. One output shaft is extended out from the drive unit 30, and one drive unit 30 is provided on one vehicle wheel, that is, the left and right vehicle wheels may be connected to different drive units 30.

A differential device (differential gear) may be provided in the transmission mechanism accommodation chamber 42, and the output shafts 50L, 50R may be connected to the differential device.

In the embodiment described above, the hybrid vehicle using the engine ENG and the electric motor MOT as the drive source is illustrated, but the present invention may be applied to an electric vehicle using only the electric motor MOT as the drive source.

At least the following matters are described in the present description. Although the corresponding constituent elements or the like in the above-described embodiment are shown in parentheses, the present invention is not limited thereto.

(1) A drive unit (drive unit 30) including:
a rotary electric machine (electric motor MOT);
a rotary electric machine case (electric motor case 40) accommodating the rotary electric machine;
an electric power conversion device (electric power conversion device PDU) electrically connected to the rotary electric machine and configured to convert electric power supplied to the rotary electric machine and electric power supplied from the rotary electric machine; and
an output shaft (output shafts 50L, 50R) extending out from the rotary electric machine case and configured to output power of the rotary electric machine,
wherein the electric power conversion device is arranged on one side (front side) of the rotary electric machine, and
wherein the output shaft (output shaft 50R) is arranged between the rotary electric machine and the electric power conversion device.

According to (1), since the output shaft is arranged between the rotary electric machine and the electric power conversion device, there is a space through which the output shaft passes, as an air layer, between the rotary electric machine and the electric power conversion device. Therefore, the heat of the rotary electrical machine can be suppressed from being transmitted to the electric power conversion device.

(2) The drive unit according to (1), wherein a cooling part (cooling part 35) through which a refrigerant passes is provided between a board of the electric power conversion device and the output shaft.

According to (2), since the cooling part through which the refrigerant passes is provided between the board of the electric power conversion device and the output shaft, the board of the electric power conversion device can be cooled using a space around the output shaft.

(3) The drive unit according to (1) or (2),
wherein the rotary electric machine case is formed integrally with the electric power conversion device.

According to (3), since the rotary electric machine case is formed integrally with the electric power conversion device, an operation of assembling the electric power conversion device can be made unnecessary.

(4) The drive unit according to any one of (1) to (3),
wherein the rotation shaft (rotation shaft 18) of the rotary electric machine is provided so as to extend in a horizontal direction,
wherein the electric power conversion device is arranged on one side (front side) of the rotary electric machine in an orthogonal direction (front-rear direction) orthogonal to both a rotation axis direction (left-right direction) and an upper-lower direction, and
wherein the output shaft extends parallel to the rotation shaft and overlaps with the rotation shaft in the upper-lower direction.

According to (4), the rotation shaft of the rotary electric machine is provided so as to extend in the horizontal direction, and the electric power conversion device is arranged on the one side of the rotary electric machine in the orthogonal direction orthogonal to both the rotation axis direction and the upper-lower direction. In addition, since the output shaft extends parallel to the rotation shaft and overlaps with the rotation shaft in the upper-lower direction, a height dimension of the drive unit can be suppressed.

(5) The drive unit according to (4),
wherein a power transmission mechanism (power transmission mechanism TM) configured to transmit rotation of the rotation shaft to the output shaft is accommodated in the rotary electric machine case,
wherein the power transmission mechanism is arranged on one side (left side) in the rotation axis direction, and
wherein the rotary electric machine and the electric power conversion device are arranged on another side (right side) in the rotation axis direction.

According to (5), since the power transmission mechanism and the rotary electric machine are arranged side by side in the rotation axis direction inside the rotary electric machine case, the height dimension of the drive unit can be further reduced.

(6) A vehicle including:
the drive unit according to any one of (1) to (5),
wherein at least one vehicle wheel (rear wheel RW) is connected to an output shaft.

According to (6), the heat of the rotary electric machine can be suppressed from being transmitted to the electric power conversion device, and output limitation due to temperature rise of the electric power conversion device can be suppressed.

(7) The vehicle according to (6), wherein a rotation shaft (rotation shaft 18) of a rotary electric machine is provided so as to extend in a vehicle width direction, wherein an electric power conversion device is arranged in front of or behind the rotary electric machine, and wherein the output shaft extends parallel to the rotation shaft and overlaps with the rotation shaft in an upper-lower direction.

According to (7), since the output shaft extends parallel to the rotation axis and overlaps with the rotation shaft in the upper-lower direction, the height dimension of the drive unit when mounted on the vehicle is reduced.

(8) The vehicle according to (7), wherein the drive unit is arranged below a luggage compartment (luggage compartment 5).

According to (8), it is possible to secure a wide luggage compartment space by arranging the drive unit below the luggage compartment.

The invention claimed is:

1. A drive unit comprising:

a rotary electric machine;

a rotary electric machine case accommodating the rotary electric machine;

an electric power conversion device electrically connected to the rotary electric machine and configured to convert electric power supplied to the rotary electric machine and electric power supplied from the rotary electric machine; and an output shaft extending out from the rotary electric machine case and configured to output power of the rotary electric machine, wherein:

the electric power conversion device is arranged on one side of the rotary electric machine;

the output shaft is arranged between the rotary electric machine and the electric power conversion device;

a cooling part through which a refrigerant passes is provided between a board of the electric power conversion device and the output shaft; and the board of the electric power conversion device and the cooling part are provided on an extension of a virtual line connecting the output shaft and a rotation shaft of the rotary electric machine.

2. The drive unit according to claim 1, wherein
the rotary electric machine case is formed integrally with the electric power conversion device.

3. The drive unit according to claim 1, wherein:
the rotation shaft of the rotary electric machine is provided so as to extend in a horizontal direction;
the electric power conversion device is arranged on one side of the rotary electric machine in an orthogonal direction orthogonal to both a rotation axis direction and an upper-lower direction; and
the output shaft extends parallel to the rotation shaft and overlaps with the rotation shaft in the upper-lower direction.

4. The drive unit according to claim 3, wherein:
a power transmission mechanism configured to transmit rotation of the rotation shaft to the output shaft is accommodated in the rotary electric machine case;
the power transmission mechanism is arranged on one side in the rotation axis direction; and
the rotary electric machine and the electric power conversion device are arranged on another side in the rotation axis direction.

5. A vehicle comprising:
the drive unit according to claim 1, wherein
at least one vehicle wheel is connected to an output shaft.

6. The vehicle according to claim 5, wherein:
the rotation shaft of the rotary electric machine is provided so as to extend in a vehicle width direction;
the electric power conversion device is arranged in front of or behind the rotary electric machine; and
the output shaft extends parallel to the rotation shaft and overlaps with the rotation shaft in the upper-lower direction.

7. The vehicle according to claim 6, wherein
the drive unit is arranged below a luggage compartment.

* * * * *